(12) United States Patent
Tranier et al.

(10) Patent No.: US 12,503,237 B2
(45) Date of Patent: Dec. 23, 2025

(54) NON-UNIFORM TUBES FOR AIRCRAFT FURNITURE

(71) Applicants:Safran Seats USA LLC, Gainesville, TX (US); Safran Seats, Plaisir (FR)

(72) Inventors: Romain Tranier, Gainesville, TX (US); Christopher Stifter, Gainesville, TX (US); Christian Verny, Plaisir (FR)

(73) Assignees: Safran Seats USA LLC, Gainesville, TX (US); Safran Seats, Plaisir (FR)

( * ) Notice: Subject to any disclaimer, the term of this patent is extended or adjusted under 35 U.S.C. 154(b) by 181 days.

(21) Appl. No.: 18/281,149

(22) PCT Filed: Mar. 12, 2021

(86) PCT No.: PCT/US2021/022115
§ 371 (c)(1),
(2) Date: Sep. 8, 2023

(87) PCT Pub. No.: WO2022/191853
PCT Pub. Date: Sep. 15, 2022

(65) Prior Publication Data
US 2024/0150023 A1 May 9, 2024

(51) Int. Cl.
*B60N 2/68* (2006.01)
*B64D 11/06* (2006.01)
(52) U.S. Cl.
CPC ............ *B64D 11/0648* (2014.12); *B60N 2/68* (2013.01)
(58) Field of Classification Search
CPC ............................ B60N 2/68; B64D 11/0648
See application file for complete search history.

(56) References Cited

U.S. PATENT DOCUMENTS 6,347,836 B1 * 2/2002 Hayotte ................ B60N 2/686
297/378.1
6,352,311 B1 * 3/2002 Hayotte ................ B60N 2/682
297/452.2
(Continued)

FOREIGN PATENT DOCUMENTS

JP 2022169435 A * 11/2022 ............... B60N 2/02
WO 2010117920 A1 10/2010
WO 2018089056 A1 5/2018

OTHER PUBLICATIONS

International Patent Application No. PCT/US2021/022115, International Search Report and Written Opinion, dated Dec. 3, 2021.

*Primary Examiner* — Timothy J Brindley
(74) *Attorney, Agent, or Firm* — Kilpatrick Townsend & Stockton LLP

(57) ABSTRACT

Described are non-uniform tubes (104) for a furniture unit for an aircraft. The non-uniform tubes can include a first end (108), a second end (110), a wall (112), and a tube central axis (118). The second end may be opposite from the first end, and the wall can extend from the first end to the second end. The wall can include an inner surface and an outer surface in which the inner surface defines a cavity (120) extending from the first end to the second end. The non-uniform tubes can include a first portion (124) between the first end and the second end. The cavity can include a cavity central axis (122), and, in the first portion (124), the cavity central axis (122) may be offset from the tube central axis (118).

16 Claims, 8 Drawing Sheets

(56) References Cited

U.S. PATENT DOCUMENTS

| | | | |
|---|---|---|---|
| 6,742,847 B2* | 6/2004 | Yanai | B60N 2/686 |
| | | | 297/216.13 |
| 8,506,015 B2 | 8/2013 | Le et al. | |
| 10,717,533 B2* | 7/2020 | Saada | B64D 11/0648 |
| 11,873,105 B2* | 1/2024 | Tranier | B64D 11/06 |
| 2003/0020306 A1* | 1/2003 | Eckendorff | B60N 2/68 |
| | | | 297/216.1 |
| 2004/0212243 A1 | 10/2004 | Johnson | |
| 2006/0185148 A1 | 8/2006 | Bucholtz et al. | |
| 2006/0201227 A1* | 9/2006 | Lepre | B62D 21/11 |
| | | | 72/370.14 |
| 2017/0240284 A1 | 8/2017 | Portoles et al. | |
| 2019/0152608 A1 | 5/2019 | Jaeger et al. | |
| 2020/0307430 A1* | 10/2020 | Watanabe | B60N 2/68 |
| 2022/0194274 A1* | 6/2022 | Hu | B60N 2/7047 |
| 2024/0109466 A1* | 4/2024 | Pöhlmann | B60N 2/68 |

\* cited by examiner

NON-UNIFORM TUBES FOR AIRCRAFT FURNITURE

FIELD OF THE INVENTION

The field of the invention relates to an furniture units for an aircraft cabin arrangement, and, more particularly, to tubes for such furniture units.

BACKGROUND

Passenger vehicles, such as aircraft, buses, trains, ships, and automobiles, often include one or more furniture units, which may include, but is not limited to, a passenger seat, a crew seat, an ottoman, a table, a galley module, a sanitary module; a storage module, etc. For example, a passenger vehicle may include passenger seats as furniture units in which passengers may be seated and otherwise use during travel. Furniture units may include one or more tubes, which may be structural or non-structural. Traditionally, such tubes, whether structural or non-structural, have had a uniform profile and construction.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, non-uniform tubes for a furniture unit of an aircraft can include a first end, a second end, and a wall. The second end may be opposite from the first end. The non-uniform tubes can include a tube central axis. The non-uniform tubes can include a first portion between the first end and the second end. The wall can extend from the first end to the second end. The wall can include an inner surface and an outer surface in which the inner surface defines a cavity extending from the first end to the second end. The cavity can include a cavity central axis, and, in the first portion, the cavity central axis may be offset from the tube central axis.

In some embodiments, the central cavity may be offset from, and parallel to, the tube central axis. In certain embodiments, the non-uniform tube can include a second portion between the first end and the second end in which, in the second portion, the central cavity axis may be collinear with the tube central axis. In various embodiments, a distance from the first end to the second end may be a length of the non-uniform tube, the outer surface can define an outer dimension along the length of the non-uniform tube, and the outer dimension may be constant along the length of the non-uniform tube.

In some embodiments, a distance between the inner surface and the outer surface may be a thickness of the wall, and in the first portion and in a crosswise direction, the thickness of the wall may be non-uniform about the tube central axis. In certain embodiments, the non-uniform tube can include a second portion between the first end and the second end, and in the second portion and in a crosswise direction, a thickness of the wall may be non-uniform about the tube central axis. In some embodiments, the non-uniform tube can include a second portion between the first end and the second end, and in the second portion, the cavity central axis may be offset from the tube central axis and may be offset from the central cavity axis of in the first portion.

According to certain embodiments of the present invention, a non-uniform tube for a furniture unit of an aircraft can include a first end, a second end, and a tubular wall. A direction from the first end to the second end may be a length of the non-uniform tube, and a crosswise direction can extend perpendicular to the length. The tubular wall can extend from the first end to the second end. The non-uniform tube can include a tube central axis extending from the first end to the second end, and the non-uniform tube can include a first portion along the length of the non-uniform tube. A thickness of the tubular wall may be non-uniform about the tube central axis in the first portion and in the crosswise direction.

In various embodiments, the tubular wall can include a cavity extending from the first end to the second end, the cavity can include a cavity central axis, and along the length of the non-uniform tube, at least a portion of the cavity central axis may not be collinear with the tube central axis. In certain embodiments, the first portion of the non-uniform tube can include the portion of the cavity central axis that is not collinear with the tube central axis. In some embodiments, the thickness of the tubular wall in the first portion and in the crosswise direction can include a first maximum thickness and a first minimum thickness, the non-uniform tube can include a second portion along the length of the non-uniform tube. A thickness of the tubular wall may be non-uniform about the tube central axis and can include a second maximum thickness and a second minimum thickness in the second portion and in the crosswise direction. The first maximum thickness of the first portion may be different from the second maximum thickness of the second portion.

In various embodiments, the non-uniform tube can include an outer dimension along the length of the non-uniform tube, and the outer dimension may be constant along the length of the non-uniform tube. In certain embodiments, the non-uniform tube can include an outer dimension along the length of the non-uniform tube, and the outer dimension may be varied along the length of the non-uniform tube.

According to certain embodiments of the present invention, a non-uniform tube for a furniture unit of an aircraft can include a first end, a second end, and a wall. The second end may be opposite from the first end. The wall can extend from the first end to the second end. The wall can include an outer surface and an inner surface. The outer surface can define an outer dimension and the inner surface can define an inner dimension. The inner dimension may not be constant along a length of the non-uniform tube between the first end and the second end. A central axis of the inner surface may not be constant along the length of the non-uniform tube.

In some embodiments, the outer dimension may be constant along the length of the non-uniform tube between the first end and the second end. In various embodiments, the outer dimension may not be constant along the length of the non-uniform tube between the first end and the second end. In certain embodiments, the central axis of the inner surface may be a cavity central axis, the non-uniform tube can include a tube central axis extending from the first end to the second end, and at least a portion of the cavity central axis may not be collinear with the tube central axis.

In some embodiments, at least two portions of the cavity central axis between first end and the second end may not be collinear with the tube central axis. In various embodiments, the non-uniform tube can include a first portion between the first end and the second end, and the wall can include a maximum thickness and a minimum thickness in the first portion and in a crosswise direction. In certain embodiments, the non-uniform tube can include a second portion between the first end and the second end, and the wall can include a uniform thickness in the second portion and in the crosswise direction.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "forward," and "aft," among others, are intended to refer to the orientation as illustrated and described in the figure (or figures) to which the components and directions are referencing but are not intended to imply any particular configuration.

The described embodiments of the invention provide non-uniform tubes for furniture units of an aircraft. Furniture units of an aircraft may include, but are not limited to, a passenger seat, a crew seat, an ottoman, a table, a console, a wall, a support structure, a galley module, a sanitary module, a storage module. As such, while the non-uniform tubes are discussed herein with respect to a passenger seat as the furniture unit, they are by no means so limited. Rather, embodiments of the non-uniform tubes may be used in other furniture units and/or furniture units for other passenger vehicles as desired.

Figure 1:
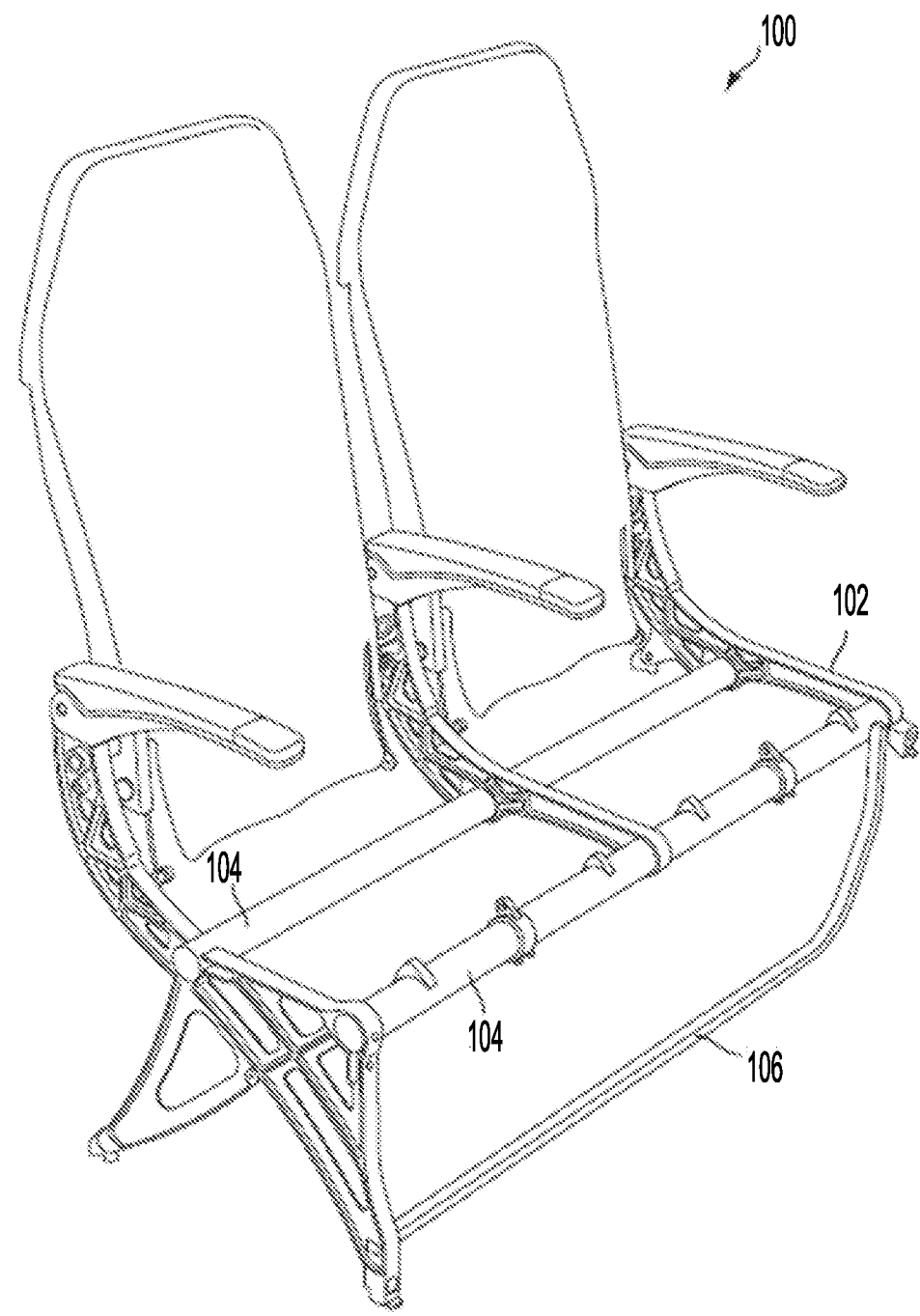
FIG. 1 is a perspective view of a passenger seat that includes a non-uniform tube according to certain embodiments of the present invention.

FIG. 1 is a perspective view of a furniture unit that is a passenger seat 100, and the passenger seat 100 includes a non-uniform tube 104 according to certain embodiments of the present invention. The passenger seat 100 includes a frame 102 that may include various components that provide support for a passenger in the passenger seat 100. Various components include, but are not limited to, leg assemblies, spreaders, seat backs, arm rests, etc. In certain embodiments, the frame 102 includes at least one non-uniform tube 104, and in certain embodiments, the passenger seat 100 includes two or more non-uniform tubes 104. As such, while two non-uniform tubes 104 are illustrated, the passenger seat 100 may include any number of non-uniform tubes as desired, including a single non-uniform tube 104 or more than two non-uniform tubes 104. Moreover, the particular non-uniform tubes 104 illustrated should not be considered limiting, and other portions of the frame 102 may include a non-uniform tube 104 as desired.

A fully assembled passenger seat 100 may include various cushioning (not shown), a bottom seat pan (not shown), in-flight entertainment equipment, tray tables, and/or other components as desire. Optionally, the passenger seat 100 includes a bottom frame component 106, which may be, but does not have to be, a non-uniform tube similar to the non-uniform tubes 104. In some embodiments, the bottom frame component 106 is a baggage bar.

As best illustrated in FIGS. 2-8, each tube 104 may be a non-uniform tube, meaning that a characteristic and/or dimension of the non-uniform tube 104 is not uniform along a length of the non-uniform tube 104 and/or in a crosswise direction of the non-uniform tube 104 (i.e., a direction perpendicular to the length of the non-uniform tube 104). As a non-limiting example, the non-uniform tube 104 may include a variable inner diameter such that in the crosswise direction, a wall thickness of a portion of the non-uniform tube is different from the wall thickness of another portion of the non-uniform tube. As another non-limiting example, the non-uniform tube 104 may have a central cavity, and an axis of the central cavity along the length of the non-uniform tube 104 may be offset from and/or not parallel to a central axis of the tube 104. As a further non-limiting example, an outer diameter or dimension of the tube 104 may be constant along the length of the non-uniform tube 104 and/or may be varied along the length of the tube 104. The non-uniform tubes 104 described herein may provide include improved strength, improved stiffness, improved inertia, and/or other improved performance indicators compared to traditional non-uniform tubes. In some cases, the tubes 104 described herein may provide the same strength as existing tubes but with less material. The non-uniform tubes 104 described herein may optionally provide improved absorption and/or dispersion of forces received from a dynamic event or from other uses of the passenger seat 100. In certain embodiments, the non-uniform tubes 104 described herein may be installed on the passenger seat 100 without drilling holes or otherwise damaging the passenger seat 100. In some embodiments, the non-uniform tubes 104 described herein may optionally be optimized to withstand various loads that may occur when used, such as a 16G force and/or a 14G force. In various embodiments, the non-uniform tubes 104 described herein may conform to, or exceed, the AS 8049 (Rev. C) standard for 14G and 16G testing. The non-uniform tubes 104 described herein may also be used in static conditions and/or non-structural conditions as desired.

The non-uniform tubes 104 described herein made from any suitable material as desired. In some non-limiting examples, the non-uniform tubes 104 may be metals such as aluminum, magnesium, and/or steel, although in other embodiments, the non-uniform tubes 104 may be made from other metals and/or non-metallic materials as desired, such as plastics, composites, combinations of materials, etc. The non-uniform tubes 104 may be formed via various suitable techniques as desired. Optionally, the non-uniform tubes 104 may be formed without machining/via a non-machining process.

Figure 2:
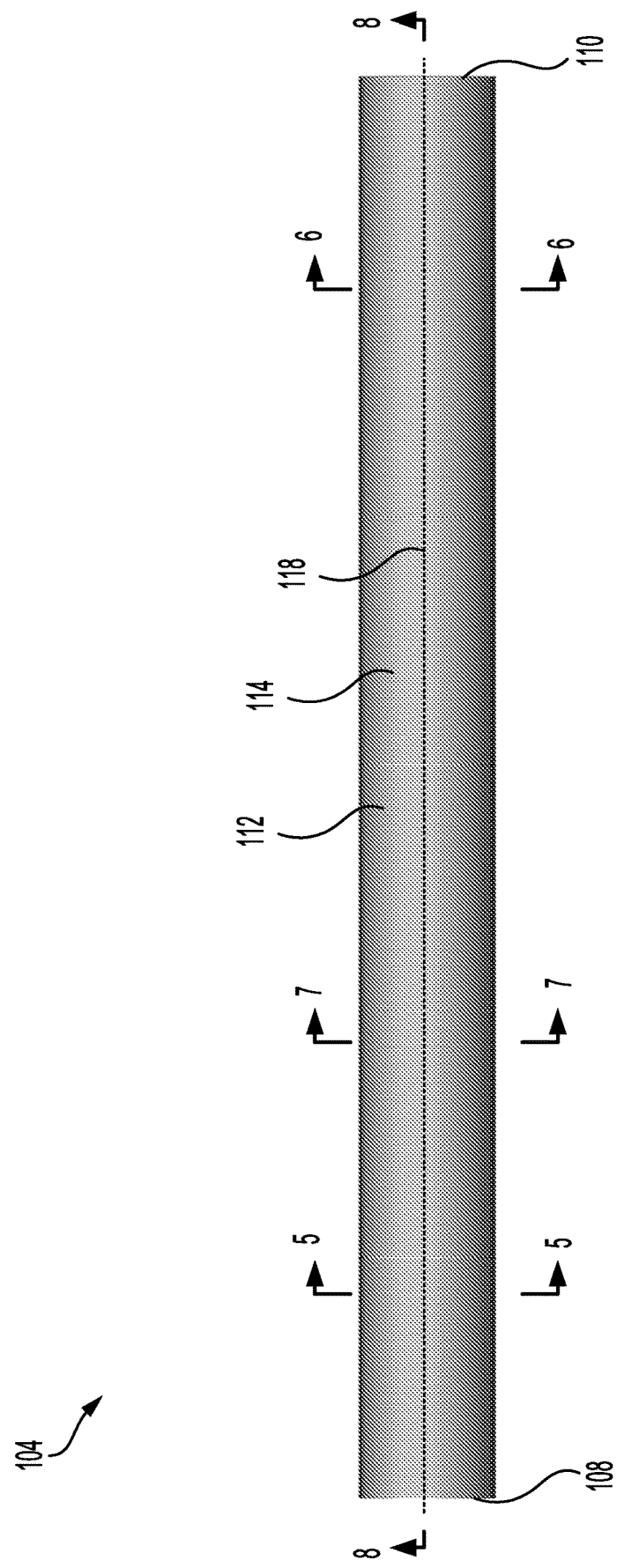
FIG. 2 is a side view of the non-uniform tube of FIG. 1.

As illustrated in FIG. 2, the non-uniform tube 104 includes a first end 108 and a second end 110 in which the second end 110 is opposite the first end 108. A distance between the first end 108 and the second end 110 is the length of the non-uniform tube 104, and a direction perpendicular to the length of the non-uniform tube 104 is the crosswise direction. A tube central axis 118 extends in the direction from the first end 108 to the second end 110. While the tube 104 is illustrated as linear or straight, in other embodiments the tube 104 may be bent or otherwise non-linear.

Figure 3:
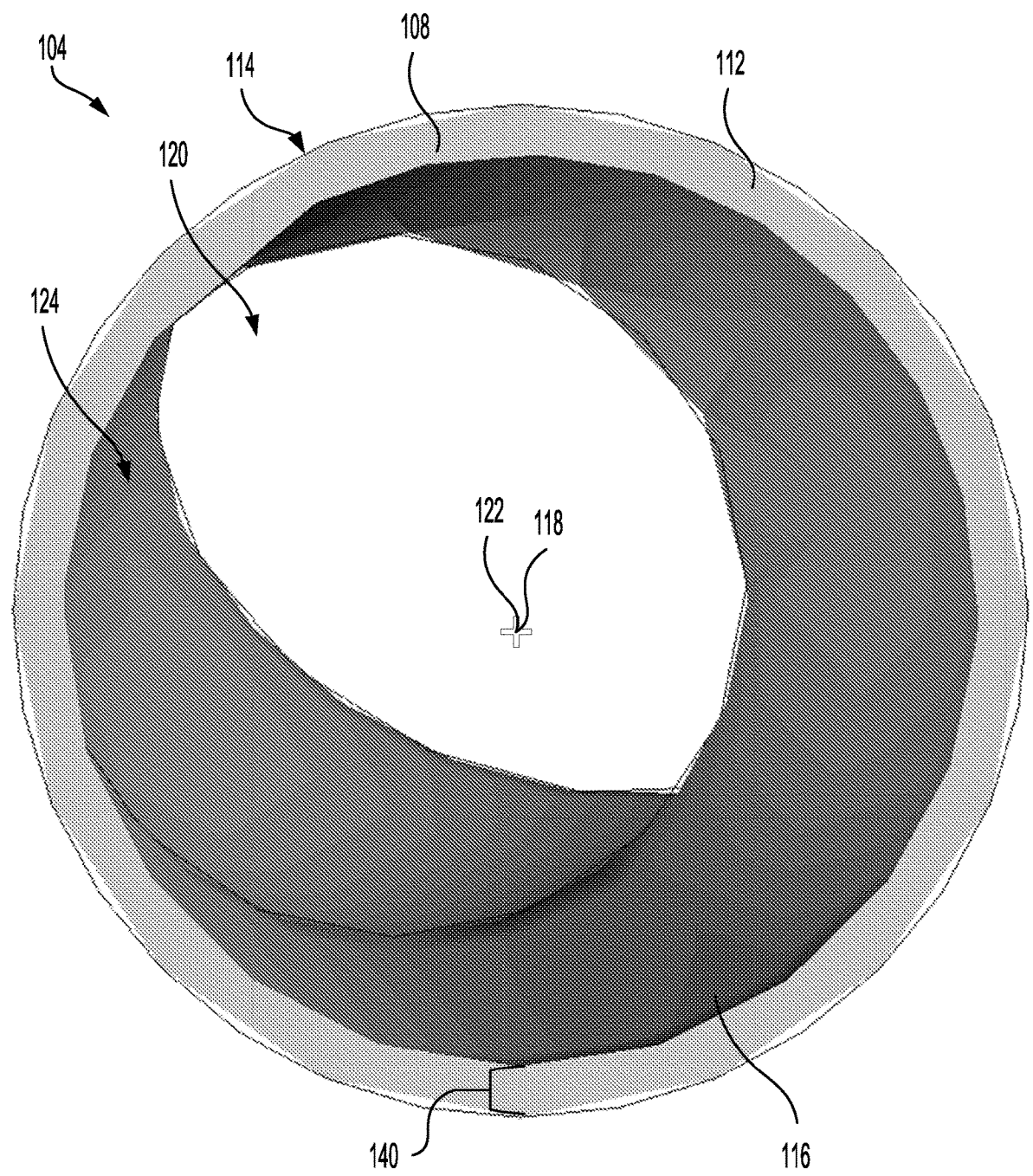
FIG. 3 is an end view of the non-uniform tube of FIG. 1.

A wall 112 extends from the first end 108 to the second end 110 and includes an outer surface 114 and an inner surface 116 (see, e.g., FIG. 3). In certain embodiments, and as illustrated in FIG. 2, the wall 112 has an outer dimension defined by the outer surface 114. Each of the outer and inner dimension may be, but does not have to be, a crosswise dimension, such as, but not limited to, a diameter, a height, or a width. For purposes of this disclosure, "dimension" and "diameter" are used interchangeably. In some embodiments, the outer dimension is constant and/or uniform along the length of the non-uniform tube 104. In other embodiments, the outer dimension may be varied and/or non-uniform along the length of the non-uniform tube 104. As a non-limiting embodiment, the outer dimension of a first portion of the non-uniform tube 104 along the length of the non-uniform tube 104 may be less than or greater than the outer dimension of a second portion of the non-uniform tube 104 along the length of the non-uniform tube 104.

Figure 4:
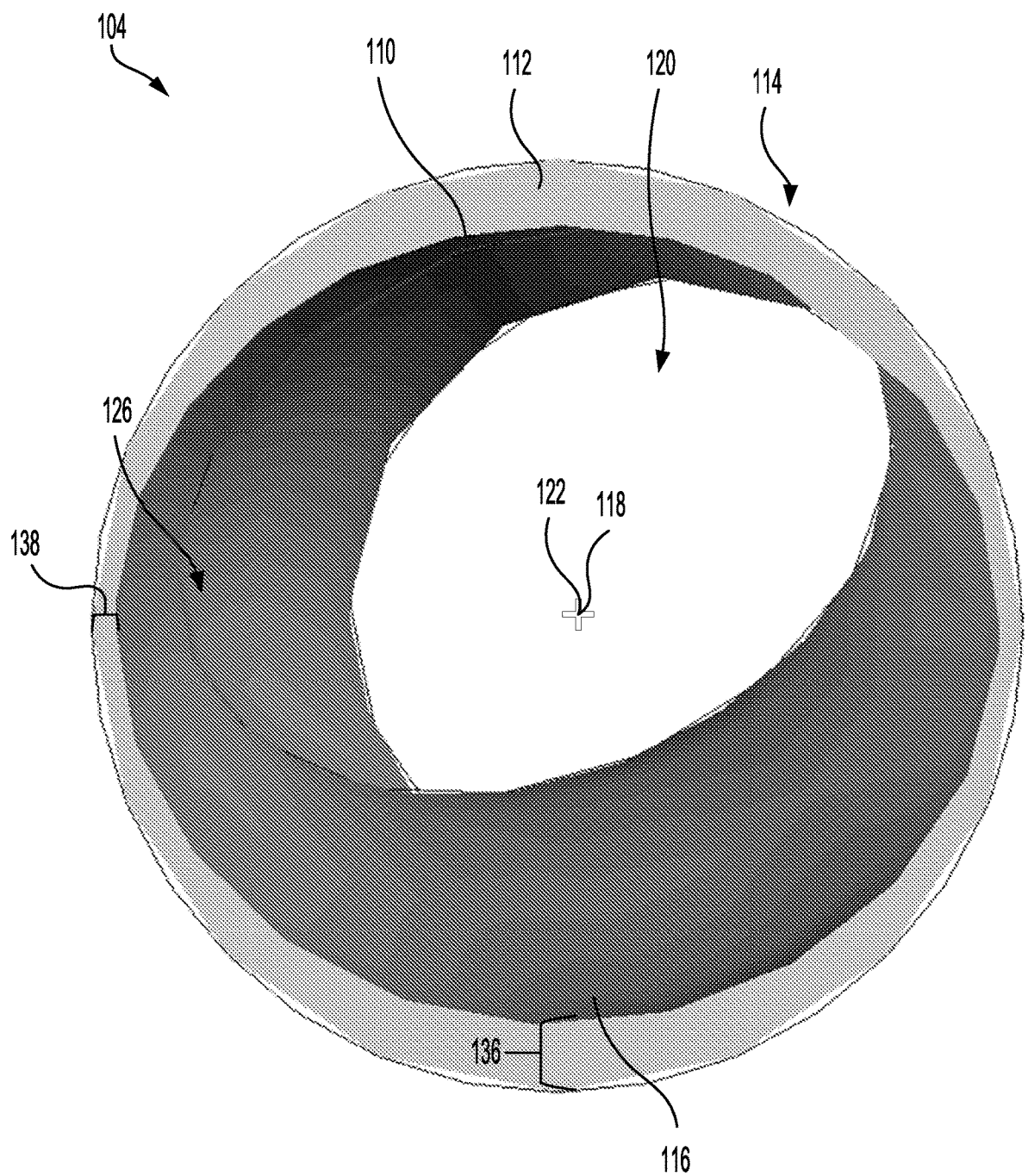
FIG. 4 is another end view of the non-uniform tube of FIG. 1.
Figure 5:
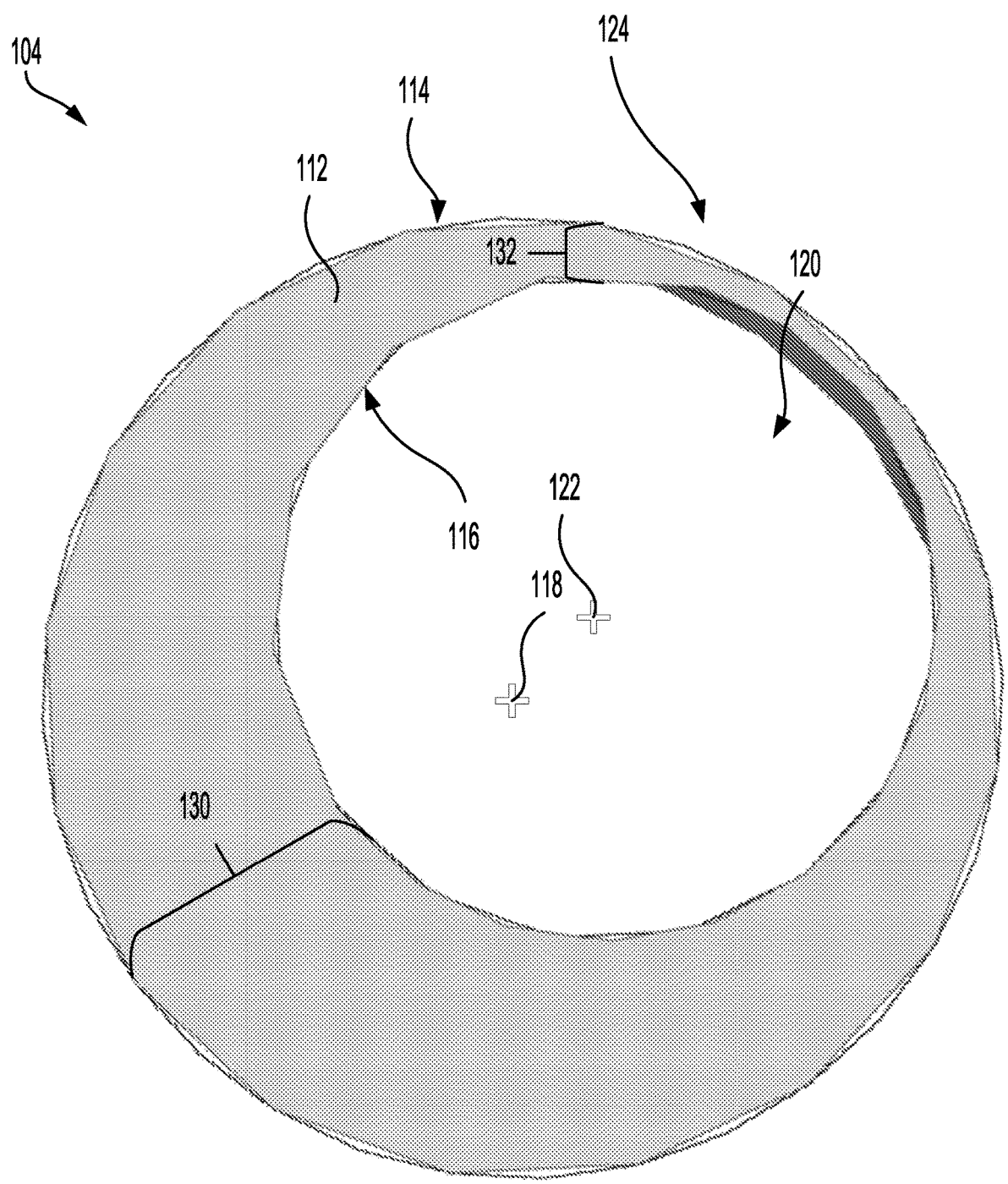
FIG. 5 is a sectional view of the non-uniform tube of FIG. 1 taken along line 5-5 in FIG. 2.
Figure 6:
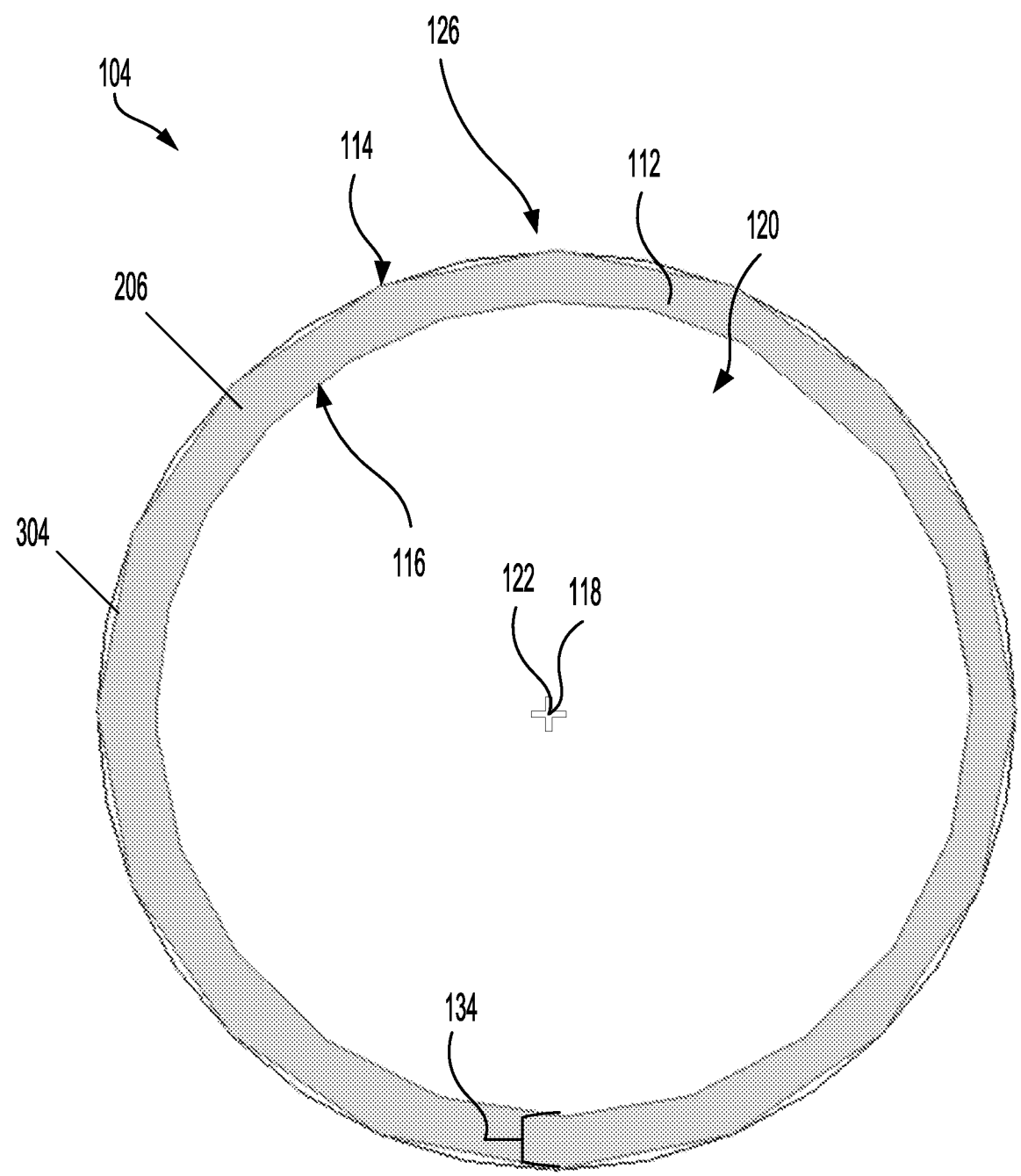
FIG. 6 is a cross-sectional view of the non-uniform tube of FIG. 1 taken along line 6-6 in FIG. 2.
Figure 7:
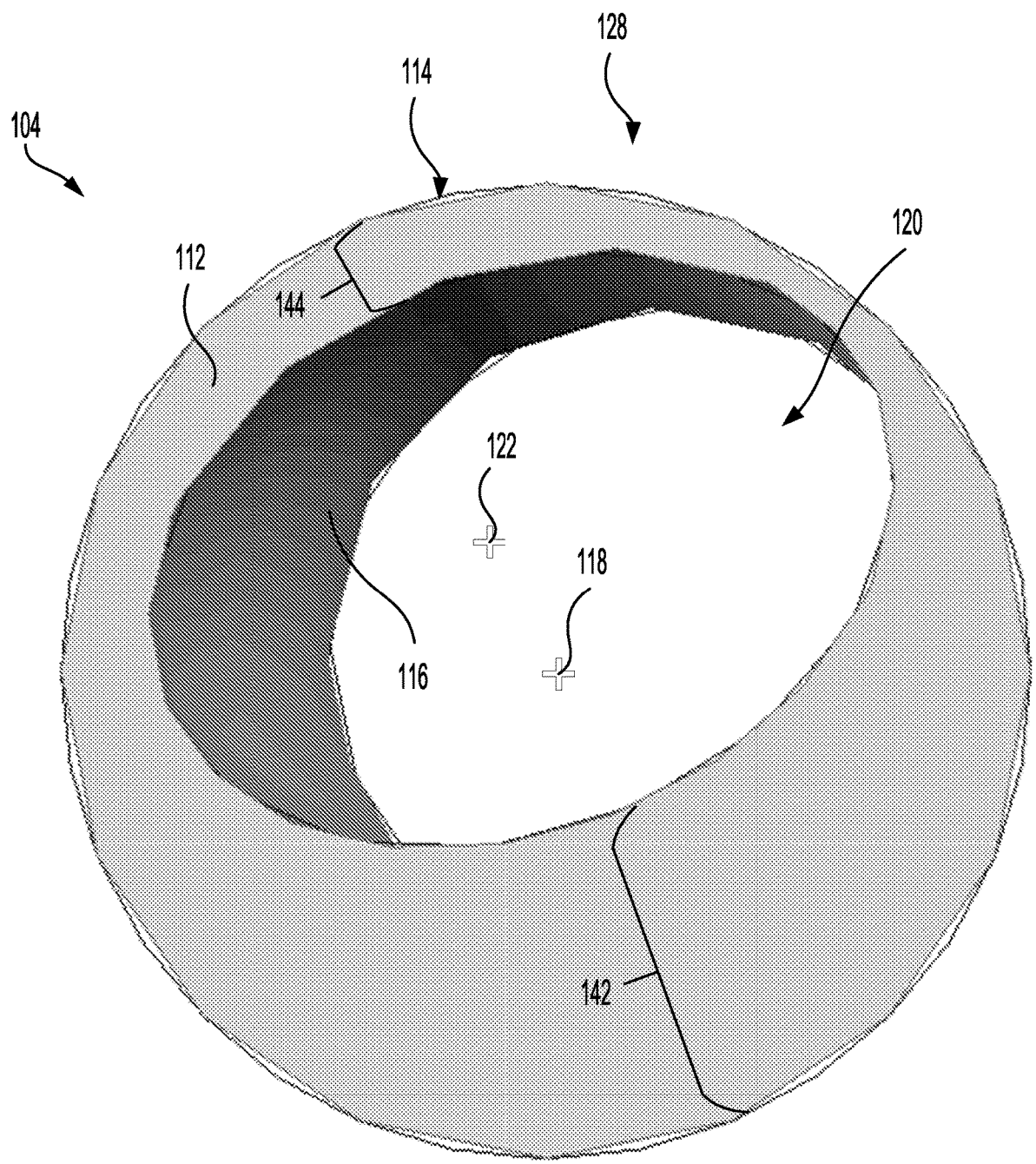
FIG. 7 is a sectional view of the non-uniform tube of FIG. 1 taken along line 7-7 in FIG. 2.
Figure 8:
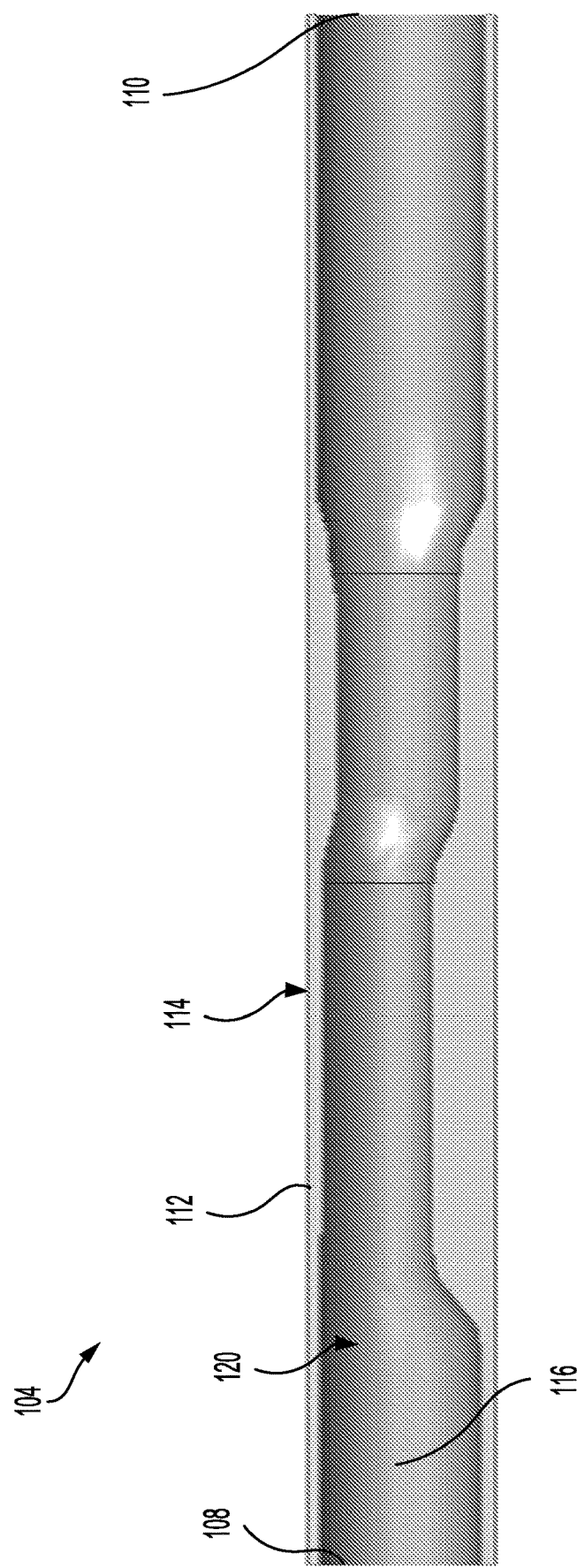
FIG. 8 is a sectional view of the non-uniform tube of FIG. 1 taken along line 8-8 in FIG. 2.

As best illustrated in FIGS. 3-8, the inner surface 116 of the non-uniform tube 104 defines a cavity 120 that may extend from the first end 108 to the second end 110. For any given portion of the cavity 120 in the crosswise direction, the cavity 120 includes a cavity central axis 122. In certain embodiments, the non-uniform tube 104 is non-uniform such that the cavity central axis 122 may be aligned with the tube central axis 118 or offset from the tube central axis 118. FIGS. 3, 4, and 6 illustrate portions of the non-uniform tube 104 where the cavity central axis 122 is aligned (or collinear) with the tube central axis 118, and FIGS. 5 and 7 illustrate portions of the non-uniform tube 104 where the cavity central axis 122 is offset from the tube central axis 118. In addition to being collinear or offset with respect to the tube central axis 118, the cavity central axis 122 may also extend parallel to the tube central axis 118 or may extend such that the cavity central axis 122 is not parallel (e.g., extends at a non-zero angle) to the tube central axis 118.

The cavity 120 may have various shapes, profiles, and/or portions both along the length of the non-uniform tube 104 and in the crosswise direction. As some non-limiting examples, FIG. 3 illustrates the cavity 120 at the first end 108 having a first profile and shape, and FIG. 4 illustrates the cavity 120 at the second end 110 having a second profile and shape that is more ovoid compared to the first end 108. FIG. 5 illustrates a first portion 124 of the non-uniform tube 104 between the first end 108 and the second end 110 where the cavity 120 has a first profile and shape that is similar in shape to the cavity 120 at the first end 108 but smaller in size compared to the cavity 120 at the first end 108. FIG. 6 illustrates a second portion 126 of the non-uniform tube 104 between the first end 108 and the second end 110 where the cavity 120 has a second profile and shape that is similar to the profile and shape of the cavity 120 at the first end 108. FIG. 7 illustrates a third portion 128 of the non-uniform tube 104 between the first end 108 and the second end 110 where the cavity 120 has a third profile and shape that is angled, smaller, and more ovoid compared to the cavity 120 at the first end 108. The cavity shapes and profiles illustrated in FIGS. 2-8 are provided merely as examples and should not be considered limiting on the disclosure. Moreover, the portions illustrated should not be considered limiting on the disclosure and reference to "first" and "second" is not intended to refer to any particular order, but rather just implies that the portions are different. In other embodiments, the non-uniform tube 104 may have various other cavities and/or tube portions having other shapes, sizes, orientations, etc. as desired.

Referring to FIGS. 2-8, a distance in the crosswise direction between the inner surface 116 and the outer surface 114 is a wall thickness of the non-uniform tube, and in certain embodiments, the wall thickness of the non-uniform tube 104 may be non-uniform in the crosswise direction and/or along the length of the non-uniform tube 104. In other embodiments, at least a portion of the non-uniform tube 104 may have a uniform thickness.

The following description referring to FIGS. 3-7 makes reference to various exemplary wall thicknesses, and it will be appreciated that the wall thickness(es) in one figure may be the same as or different from the wall thickness(es) in another figure. As some non-limiting examples, FIG. 3 illustrates the first end 108 of the non-uniform tube 104 having a uniform wall thickness 140 and FIG. 6 illustrates the second portion 126 of the non-uniform tube 104 having a uniform wall thickness 134, which may be, but does not have to be, the same thickness as the wall thickness 140.

As another non-limiting example, FIG. 4 illustrates the second end 110 of the non-uniform tube 104 that includes a non-uniform wall thickness and has at least two different wall thicknesses 136, 138, where the wall thickness 138 is less than the wall thickness 136. FIG. 4 illustrates additional wall thickness that may be greater than or equal to the wall thickness 136, less than or equal to the wall thickness 138, or a thickness that is between the wall thickness 136 and the wall thickness 136.

As another non-limiting example, FIG. 5 illustrates the first portion 124 of the non-uniform tube 104 that includes a non-uniform wall thickness and has at least two different wall thicknesses 130, 132, where the wall thickness 132 is less than the wall thickness 130. FIG. 5 illustrates additional wall thickness that may be greater than or equal to the wall thickness 130, less than or equal to the wall thickness 132, or a thickness that is between the wall thickness 130 and the wall thickness 132.

As another non-limiting example, FIG. 6 illustrates the third portion 128 of the non-uniform tube 104 that includes a non-uniform wall thickness and has at least two different wall thicknesses 142, 144, where the wall thickness 144 is less than the wall thickness 142. FIG. 6 illustrates additional wall thickness that may be greater than or equal to the wall thickness 142, less than or equal to the wall thickness 144, or a thickness that is between the wall thickness 142 and the wall thickness 144.

FIG. 9 illustrates the wall thicknesses of the entire non-uniform tube 104 (as well as the cavity 120) and shows how the wall thicknesses may be uniform or non-uniform, and the cavity 120 may have various shapes, orientations, and positions of its central axis as desired. The layout illustrated in FIG. 9 should not be considered limiting, and non-uniform tubes may have various combinations and/or arrangements of wall thicknesses and the cavity along the length of the non-uniform tube as desired.

A collection of exemplary embodiments are provided below, including at least some explicitly enumerated as "Examples" providing additional description of a variety of example embodiments in accordance with the concepts described herein. These examples are not meant to be mutually exclusive, exhaustive, or restrictive; and the disclosure not limited to these examples but rather encompasses all possible modifications and variations within the scope of the issued claims and their equivalents.

Example 1. A non-uniform tube for a furniture unit for an aircraft, the non-uniform tube comprising: a first end; a second end opposite from the first end; and a wall extending from the first end to the second end, wherein the wall comprises an inner surface and an outer surface, wherein the inner surface defines a cavity extending from the first end to the second end, wherein the cavity comprises a cavity central axis, wherein the non-uniform tube comprises a tube central axis, and wherein the non-uniform tube comprises a first portion between the first end and the second end, and wherein, in the first portion, the cavity central axis is offset from the tube central axis.

Example 2. The non-uniform tube of any of the preceding or subsequent examples or combination of examples, wherein, in the first portion, the central cavity is offset from and parallel to the tube central axis.

Example 3. The non-uniform tube of any of the preceding or subsequent examples or combination of examples, wherein the non-uniform tube comprises a second portion between the first end and the second end, and wherein, in the second portion, the central cavity axis is collinear with the tube central axis.

Example 4. The non-uniform tube of any of the preceding or subsequent examples or combination of examples, wherein a distance from the first end to the second end is a length of the non-uniform tube, wherein the outer surface defines an outer dimension along the length of the non-uniform tube, and wherein the outer dimension is constant along the length of the non-uniform tube.

Example 5. The non-uniform tube of any of the preceding or subsequent examples or combination of examples, wherein a distance between the inner surface and the outer surface is a thickness of the wall, and wherein, in the first portion and in a crosswise direction, the thickness of the wall is non-uniform about the tube central axis.

Example 6. The non-uniform tube of any of the preceding or subsequent examples or combination of examples, wherein the non-uniform tube comprises a second portion between the first end and the second end, and wherein, in the second portion and in a crosswise direction, a thickness of the wall is non-uniform about the tube central axis.

Example 7. The non-uniform tube of any of the preceding or subsequent examples or combination of examples, wherein the non-uniform tube comprises a second portion between the first end and the second end, and wherein, in the second portion, the cavity central axis is offset from the tube central axis and offset from the central cavity axis of in the first portion.

Example 7.a. An aircraft furniture unit comprising the non-uniform tube of any of the preceding or subsequent examples or combination of examples, wherein the aircraft furniture unit comprises a passenger seat.

Example 7.b. The non-uniform tube of any of the preceding or subsequent examples or combination of examples, wherein the non-uniform tube is bent or non-linear between the first end and the second end.

Example 8. A non-uniform tube for a furniture unit for an aircraft, the non-uniform tube comprising: a first end; a second end, wherein a direction from the first end to the second end is a length of the non-uniform tube, and wherein a crosswise direction extends perpendicular to the length; and a tubular wall extending from the first end to the second end, wherein the non-uniform tube comprises a tube central axis extending from the first end to the second end, wherein the non-uniform tube comprises a first portion along the length of the non-uniform tube, and wherein, in the first portion and in the crosswise direction, a thickness of the tubular wall is non-uniform about the tube central axis.

Example 9. The non-uniform tube of any of the preceding or subsequent examples or combination of examples, wherein the tubular wall comprises a cavity extending from the first end to the second end, wherein the cavity comprises a cavity central axis, and wherein along the length of the non-uniform tube, at least a portion of the cavity central axis is not collinear with the tube central axis.

Example 10. The non-uniform tube of any of the preceding or subsequent examples or combination of examples, wherein the first portion of the non-uniform tube comprises the portion of the cavity central axis that is not collinear with the tube central axis.

Example 11. The non-uniform tube of any of the preceding or subsequent examples or combination of examples, wherein the thickness of the tubular wall in the first portion and in the crosswise direction comprises a first maximum thickness and a first minimum thickness; the non-uniform tube comprises a second portion along the length of the non-uniform tube; in the second portion and in the crosswise direction, a thickness of the tubular wall is non-uniform about the tube central axis and comprises a second maximum thickness and a second minimum thickness; and wherein the first maximum thickness of the first portion is different from the second maximum thickness of the second portion.

Example 12. The non-uniform tube of any of the preceding or subsequent examples or combination of examples, wherein the non-uniform tube comprises an outer dimension along the length of the non-uniform tube, and wherein the outer dimension is constant along the length of the non-uniform tube.

Example 13. The non-uniform tube of any of the preceding or subsequent examples or combination of examples, wherein the non-uniform tube comprises an outer dimension along the length of the non-uniform tube, and wherein the outer dimension is varied along the length of the non-uniform tube.

Example 14. A non-uniform tube for a furniture unit for an aircraft, the non-uniform tube comprising: a first end; a second end opposite from the first end; and a wall extending from the first end to the second end, wherein the wall comprises an outer surface and an inner surface, wherein the outer surface defines an outer dimension and the inner surface defines an inner dimension, wherein the inner dimension is not constant along a length of the non-uniform tube between the first end and the second end, and wherein a central axis of the inner surface is not constant along the length of the non-uniform tube.

Example 15. The non-uniform tube of any of the preceding or subsequent examples or combination of examples, wherein the outer dimension is constant along the length of the non-uniform tube between the first end and the second end.

Example 16. The non-uniform tube of any of the preceding or subsequent examples or combination of examples, wherein the outer dimension is not constant along the length of the non-uniform tube between the first end and the second end.

Example 17. The non-uniform tube of any of the preceding or subsequent examples or combination of examples, wherein the central axis of the inner surface is a cavity central axis, wherein the non-uniform tube comprises a tube central axis extending from the first end to the second end, and wherein at least a portion of the cavity central axis is not collinear with the tube central axis.

Example 18. The non-uniform tube of any of the preceding or subsequent examples or combination of examples, wherein at least two portions of the cavity central axis between first end and the second end are not collinear with the tube central axis.

Example 19. The non-uniform tube of any of the preceding or subsequent examples or combination of examples, wherein the non-uniform tube comprises a first portion between the first end and the second end, and wherein, in the first portion and in a crosswise direction, the wall comprises a maximum thickness and a minimum thickness.

Example 20. The non-uniform tube of any of the preceding or subsequent examples or combination of examples, wherein the non-uniform tube comprises a second portion between the first end and the second end, and wherein, in the second portion and in the crosswise direction, the wall comprises a uniform thickness.

Example 21. The non-uniform tube of any of the preceding or subsequent examples or combinations of examples, wherein the furniture unit is a passenger seat.

Different arrangements of the components depicted in the drawings or described above, as well as components and steps not shown or described, are possible. Similarly, some features and sub-combinations are useful and may be employed without reference to other features and sub-combinations. Embodiments of the invention have been described for illustrative and not restrictive purposes, and alternative embodiments may become apparent to readers of this patent. Accordingly, the present invention is not limited to the embodiments described above or depicted in the drawings, and various embodiments and modifications may be made without departing from the scope of the claims below.

That which is claimed is:

1. A non-uniform tube for a furniture unit for an aircraft, the non-uniform tube comprising:
    a first end;
    a second end opposite from the first end; and
    a wall extending from the first end to the second end, wherein the wall comprises an inner surface and an outer surface, wherein the inner surface defines a cavity extending from the first end to the second end, wherein a distance from the first end to the second end is a length of the non-uniform tube, wherein the outer surface defines an outer dimension along the length of the non-uniform tube, and wherein the outer dimension is constant along the length of the non-uniform tube, wherein the cavity comprises a cavity central axis, wherein the non-uniform tube comprises a tube central axis, and
    wherein the non-uniform tube comprises a first portion between the first end and the second end, wherein, in the first portion, the cavity central axis is offset from the tube central axis,
    wherein:
        a thickness of the wall in the first portion and in a crosswise direction comprises a first maximum thickness and a first minimum thickness;
        the non-uniform tube comprises a second portion along the length of the non-uniform tube;
        in the second portion and in the crosswise direction, a thickness of the wall is non-uniform about the tube central axis and comprises a second maximum thickness and a second minimum thickness; and
        wherein the first maximum thickness of the first portion is different from the second maximum thickness of the second portion.

2. The non-uniform tube of claim 1, wherein, in the first portion, the cavity central axis is offset from and parallel to the tube central axis.

3. The non-uniform tube of claim 1, wherein the non-uniform tube comprises a second portion between the first end and the second end, and wherein, in the second portion, the central cavity axis is collinear with the tube central axis.

4. The non-uniform tube of claim 1, wherein a distance between the inner surface and the outer surface is a thickness of the wall, and wherein, in the first portion and in a crosswise direction, the thickness of the wall is non-uniform about the tube central axis.

5. The non-uniform tube of claim 1, wherein the non-uniform tube comprises a second portion between the first end and the second end, and wherein, in the second portion and in a crosswise direction, a thickness of the wall is non-uniform about the tube central axis.

6. The non-uniform tube of claim 1, wherein the non-uniform tube comprises a second portion between the first end and the second end, and wherein, in the second portion, the cavity central axis is offset from the tube central axis and offset from the central cavity axis of the first portion.

7. The non-uniform tube of claim 1, wherein the non-uniform tube is bent or non-linear between the first end and the second end.

8. The non-uniform tube of claim 1, wherein the non-uniform tube is linear between the first end and the second end.

9. The non-uniform tube of claim 1, wherein the non-uniform tube comprises a metal material.

10. An aircraft furniture unit comprising the non-uniform tube of claim 1.

11. The aircraft furniture unit of claim 10, wherein the aircraft furniture unit comprises a passenger seat.

12. The aircraft furniture unit of claim 11, wherein the non-uniform tube is a base frame tube of the passenger seat.

13. A non-uniform tube for a furniture unit for an aircraft, the non-uniform tube comprising:
    a first end;
    a second end, wherein a direction from the first end to the second end is a length of the non-uniform tube, and wherein a crosswise direction extends perpendicular to the length; and
    a tubular wall extending from the first end to the second end and having a constant outer dimension and defining a cavity extending from the first end to the second end, wherein the non-uniform tube comprises a tube central axis extending from the first end to the second end, wherein the non-uniform tube comprises a first portion along the length of the non-uniform tube and a second portion along the length of the non-uniform tube, and wherein, in the crosswise direction:

in the first portion, a thickness of the tubular wall is non-uniform about the tube central axis; and a shape of the cavity in the first portion is different from a shape of the cavity in the second portion.

14. The non-uniform tube of claim 7, wherein the cavity comprises a cavity central axis, and wherein along the length of the non-uniform tube, at least a portion of the cavity central axis is not collinear with the tube central axis.

15. A non-uniform tube for a furniture unit for an aircraft, the non-uniform tube comprising:

a first end;

a second end opposite from the first end; and a wall extending from the first end to the second end, wherein the wall comprises an outer surface and a continuous inner surface, wherein the continuous inner surface defines a cavity extending from the first end to the second end, wherein the outer surface defines an outer dimension and the inner surface defines an inner dimension, wherein the inner dimension is not constant along a length of the non-uniform tube between the first end and the second end, wherein the outer dimension is constant along the length of the non-uniform tube between the first end and the second end, and wherein a central axis of the inner surface is not constant along the length of the non-uniform tube, wherein the non-uniform tube comprises a first portion at the first end, a second portion at the second end, and a third portion between the first portion and the second portion, wherein, in a crosswise direction:

a shape and dimension of the cavity in the first portion is the same as a shape and dimension of the cavity in the second portion; and at least one of:

the shape of the cavity in the third portion is different from the shape of the cavity in the first and second portions, or a cavity central axis of the cavity in the third portion is offset from the cavity central axis of the cavity in the first and second portions.

16. The non-uniform tube of claim 15, wherein the non-uniform tube comprises a first portion between the first end and the second end, and wherein, in the first portion and in a crosswise direction, the wall comprises a maximum thickness and a minimum thickness.

\* \* \* \* \*